Aug. 25, 1959  E. WELFERS ET AL  2,901,188
APPARATUS FOR SUBDIVIDING SOLIDS
Filed Aug. 7, 1956

INVENTORS:
EGIDIUS WELFERS
HEINZ HOSE
BY *Maryall, Johnston,*
*Cook & Root*

ATT'YS

United States Patent Office 2,901,188
Patented Aug. 25, 1959

2,901,188

APPARATUS FOR SUBDIVIDING SOLIDS

Egidius Welfers, Kassel, and Heinz Hose, Kassel-Ndzw., Germany, assignors to Spinnfaser Aktiengesellschaft, Kassel-Bettenhausen, Germany Application August 7, 1956, Serial No. 602,638

Claims priority, application Germany August 8, 1955

3 Claims. (Cl. 241—152)

This invention in general relates to apparatus for breaking up nodules of solids dispersed in a liquid medium and has particular relation to the manufacture of viscose in breaking up and facilitating the solution of cellulose xanthogenate nodules.

The best possible homogeneity and filterability of spinning solutions of viscose is not only important for economic reasons but, as is well known, it extensively influences the quality of the threads produced. A good, filterable viscose is obtained only when the cellulose xanthogenate is successfully brought completely into solution.

Cellulose xanthogenate is produced by the reaction of alkali cellulose with carbon disulfide. It is not possible with the present sulfidizing processes to distribute the carbon disulfide in the alkali cellulose in such a way that no lump or nodule formation sets in. The problem, therefore, is that of assisting the chemical dissolving process, that is the dissolving of the cellulose xanthogenate in caustic soda solution, by mechanical means. The cellulose xanthogenate nodules are not chemically homogeneous either because the inner parts of the nodules are inadequately sulfidized or, in part, not at all sulfidized. Furthermore, under the action of the caustic soda solution there is formed on the surface of the xanthogenate nodules an additional sticky layer which is quite resistant to caustic and retards or prevents the dissolving of the inner parts of the nodules.

For these reasons the dissolving process has been carried out in suitable devices for reducing the xanthogenate nodules mechanically. These devices in general grind the coarse undissolved xanthogenate particles between surfaces having different relative velocities. It is understandable that by reason of the soft rubbery quality of the nodules this operation must be repeated numerous times until the viscose no longer contains solid particles to clog the filter presses. If, as has already been tried, the distance between the sliding surfaces is diminished, a better and more rapid dissolving effect is achieved. At the same time, however, because of the greater friction, the temperature rises. High temperatures are not tolerable with sensitive viscose solutions. It is, of course, conceivable to remove the frictional heat by cooling apparatus, but this involves additional installations and power expenditures.

It is an object of this invention to provide apparatus for breaking up nodules dispersed in a liquid medium.

A further object is to provide apparatus to assist by mechanical means in the solution of cellulose xanthogenate nodules in the manufatcure of viscose.

The embodiments of the apparatus for accomplishing these objects are illustrated in the drawing where:

Figure 1:
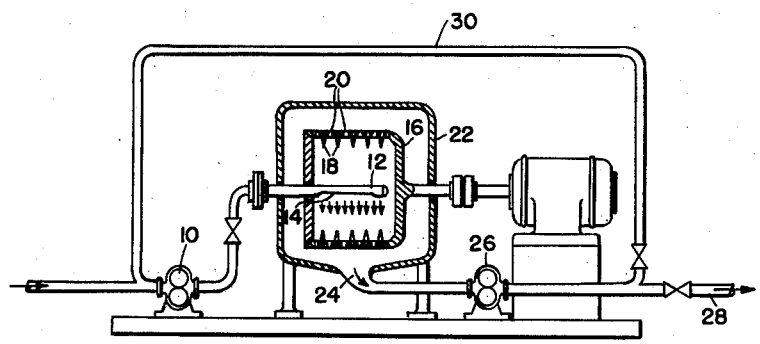
Fig. 1 is a side view, partially in section, of an embodiment of the apparatus wherein a single rotating drum is employed.
Figure 3:
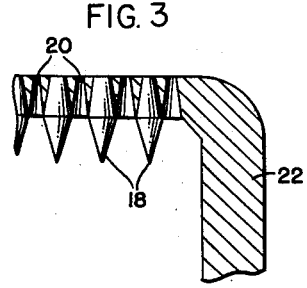
Fig. 3 is an enlarged view of a corner of the cross-section of the drum of Fig. 1.
Figure 4:
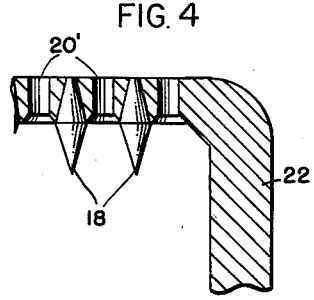
Fig. 4 is an enlarged view, similar to Fig. 3, showing a modification of the opening through the cylindrical wall of the drum.
Figure 5:
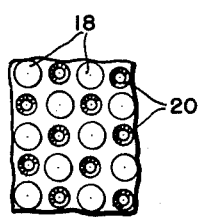
Fig. 5 is an enlarged, fragmentary view of the inner wall of the drum of Fig. 1.

Turning now to the drawing, particularly Fig. 1, the solution containing solid particles is forced by a pump 10 through a valve supply line in the form of a closed end tube 12 provided with an elongated slit 14. The tube 12 is concentrically located and terminates inside a motor-driven, rotatbale cylindrical drum 16, preferably having a horizontal axis of rotation. The drum 16 has mounted on the inner cylindrical wall thereof sharp protrusions 18 spaced both axially and circumferentially on said inner wall and extending radially inwardly. As shown in Figs. 3 and 4, the uniformly distributed protrusions 18 are preferably conical in form, although other tapered, sharp forms such as pyramidal are also operative, and are mounted in the cylindrical wall by a press fit in tapered openings in said wall. The cylindrical wall of the drum 16 also contains ports or openings 20 extending therethrough. The openings 20 are preferably larger on the inner side of the cylindrical wall to facilitate removal of the liquid. As such, they may take the form of tapered openings 20 as shown in detail in Fig. 3, or may be, as shown in Fig. 4, countersunk openings 20'.

The rotatable drum is mounted in an enclosing housing 22 having a drain 24. The pump 26 facilitates the removal of the liquid after it has passed through the drum 16, which liquid then passes through valved take-off line 28 or may be pumped through the valved recycle line 30 for a second passage through the apparatus.

Figure 2:
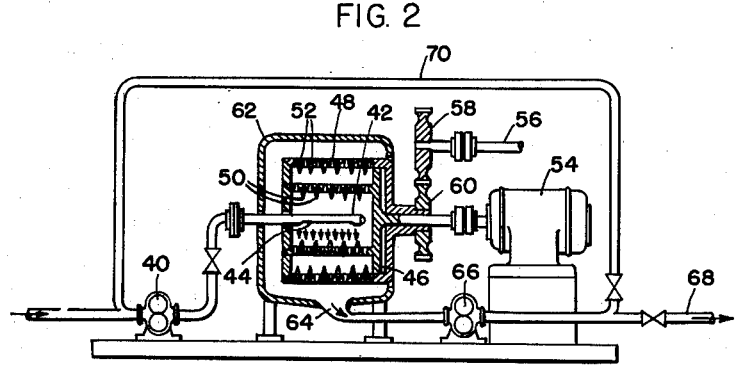
Fig. 2 is a side view, partially in cross-section, of a second embodiment wherein two drums, rotating at different relative velocities, are employed.

A second embodiment of the apparatus is illustrated in Fig. 2. This embodiment differs primarily from that of Fig. 1 in that there are inner and outer concentric drums rotating at different relative velocities to further facilitate the impact and shredding treatment to the solid particles by the pointed protrusions on the inner portion of the cylindrical wall of the rotating drum. In this second embodiment the liquid containing the solid particles to be broken up is pumped by pump 40 through a valved supply line in the form of a closed end tube 42 having an elongated slit 44. The tube 42 is concentrically located and terminates inside an inner cylindrical drum 46 which, in turn, is mounted inside an outer cylindrical drum 48. Each of the drums 46 and 48 have ports or openings 52 similar to the ports or openings 20 or 20' as in Figs. 3 and 4. Also, each of the drums 46 and 48 have mounted on the inner cylindrical walls thereof sharp protrusions 50 extending radially inwardly and preferably of conical shape, although other sharp configurations such as pyramidal are also operative. The inner drum 46 is operably connected to and rotated by motor 54. A rotatable power shaft 56 is connected by suitable gear mechanism 58, 60 to the outer drum 48, which is rotatably mounted about the shaft between the inner drum 46 and motor 54. The rotatable power shaft 56 may be connected by a suitable gear mechanism to the motor 54 or another motor (not shown). The independently rotatable drums 46 and 48 are rotated at different relative velocities, either in the same direction at different revolution rates or in opposite directions at the same or different revolution rates.

The two drums are rotatably mounted in an enclosing housing 62 having drain 64, pump 66, take-off line 68 and recycle line 70 in a manner similar to the corresponding members 24—30 of Fig. 1.

In the operation of the apparatus the liquid containing nodules of solids such as a viscose solution containing cellulose xanthogenate nodules is pumped by pump 10 into the interior of the drum 16 or 46. The falling liquid is brought into contact with the pointed protrusions 18 of the rotating hollow member. The pointed protrusions, moving at high velocity in orbital paths, break the nodules and in the case of viscose solutions facilitate the dissolving of the cellulose xanthogenate particles. The liquid passes continuously by centrifugal force through the zone of contact with the protrusions and thence through the ports or openings 20 or 20' and is collected in the housing 22 or 62. The liquid thereafter passes through drain 24 or 64 and is pumped through pump 26 or 66 to the take-off line 28 or 68 or recycled through lines 30 or 70, if desired.

In the apparatus of Fig. 2, the liquid after passing out of the inner drum 46 is again contacted with the pointed protrusions moving at high speed at a different relative velocity. The outer drum 48 thereby imparts a second impact action against the liquid and any solids remaining undissolved therein. The solution then is collected in the housing 62 in the manner previously described.

The invention is hereby claimed as follows:

1. A device suitable for subdividing solids dispersed in a liquid which comprises: a first, rotatably mounted, cylindrical, outer drum; a second, cylindrical, inner drum inside said first drum and mounted for rotation independent of the rotation of said first drum; said drums having uniformly distributed on the inner side of the cylindrical walls thereof a plurality of protrusions, each protrusion being tapered to a sharp point spaced inwardly from the inner side of the cylindrical walls of said drums; said cylindrical walls having a plurality of openings therethrough; drive means for rotating said drums at different relative velocities; and a conduit extending into said inner drum for delivering a liquid containing solids to the inner portion of said inner drum.

2. A device suitable for subdividing solids dispersed in a liquid which comprises: independently rotatable, cylindrical, concentric, inner and outer drums having a horizontal axis of rotation; said drums having uniformly distributed on the inner side of the cylindrical walls thereof a plurality of conical, sharply pointed protrusions; said cylindrical walls having a plurality of uniformly distributed openings therethrough; drive means for rotating said drums at different relative velocities; and means for delivering a liquid containing solids to the inner portion of said inner drum.

3. The device of claim 1 wherein said protrusions are conical in shape.

References Cited in the file of this patent

UNITED STATES PATENTS

| | | |
|---|---|---|
| 1,089,238 | Martin | Mar. 3, 1914 |
| 1,363,572 | Dalzell | Dec. 28, 1920 |
| 1,796,104 | Hopkins | Mar. 10, 1931 |
| 2,115,123 | Russell | Apr. 26, 1938 |
| 2,180,301 | Saylor | Nov. 14, 1939 |
| 2,447,532 | Rafton | Aug. 24, 1948 |
| 2,482,235 | Becchia | Sept. 20, 1949 |
| 2,507,614 | Sarland | May 16, 1950 |
| 2,698,745 | Boucher | Jan. 4, 1955 |

FOREIGN PATENTS

| | | |
|---|---|---|
| 97,630 | Switzerland | Apr. 2, 1923 |